Patented Mar. 5, 1929.

1,704,106

UNITED STATES PATENT OFFICE.

EMIL SCHELLER, OF LORSBACH IN TAUNUS, GERMANY, ASSIGNOR TO DEUTSCHE GOLD & SILBER SCHEIDEANSTALT, VORMALS ROESSLER, OF FRANKFORT-ON-THE-MAIN, GERMANY, A CORPORATION.

PROCESS FOR ARSENATING ORGANIC COMPOUNDS.

No Drawing. Application filed November 8, 1926, Serial No. 147,176, and in Germany November 15, 1924.

My invention relates to the arsenating of organic compounds by which process for instance organic arsonic acids can be obtained easily.

According to my invention organic diazo compounds of the type R.N.=N.Cl wherein R may mean either a carbocyclic or a heterocyclic ring are made to react with halogenides of arsenic for instance arsenious trichloride whereby a double compound is produced. The addition compound thus obtained is subsequently decomposed. The reaction may be carried out in presence or absence of water. When working in the presence of water it is advisable to limit its quantity. Furthermore I have found it useful to work in the presence of catalysts, thereby facilitating the reaction. Metallic copper and copper compounds for instance come into consideration as catalysts favoring the reaction.

In carrying out my invention I diazotize an organic amino compound which may be of a carbocyclic or heterocyclic nature taking the precautions and the directions above mentioned. In order to exclude water as far as possible the diazotizing may be executed for instance in concentrated acetic acid by means of amyl nitrite or solid sodium nitrite or a saturated solution of alkali metal nitrite in water. In the latter case it is advisable to use only such quantities of water as will just dissolve the alkali metal nitrite. To the diazo solution which is free from water or contains only a relatively small quantity, the necessary quantity of a halogenide of arsenic for instance arsenious trichloride is added. The mixture is warmed or allowed to stand for some time at ordinary temperature in order to finish the reaction. The mixture may stand even in the cold, but in this case the time taken for the completion of the reaction will be a longer one. The addition compound is then decomposed by treating it with a sufficient quantity of water. When arsenious trichloride has been used for producing the double compound hydrochloric acid is formed on the treatment with water. The nitrogen escapes in a gaseous form and the arsenic acid $R.AsO_3H_2$ which has been the aim of the procedure remains as residue. The pure arsenic acid is obtained from the residue by for instance extracting the latter with water or with alkali hydroxide solution or by means of an organic solvent or the like according to the properties of the acid formed. The isolation and purification of the acid may also be effected by converting it into the arseno-compound for instance by means of sodium hydrosulphite and oxidizing the precipitate with the aid of suitable oxidizing agents for instance hydrogen peroxide. The invention may also be carried out by diazotizing the amino compound serving as starting material in the presence of the halogenide of arsenic which is required for the formation of the double compound.

*Example 1.*—74 grms. of alpha-hydroxy-beta-amino-pyridine in mixture with 700 cc. glacial acetic acid, 137 grms. arsenious trichloric and 5 grms, of cuprous chloride are diazotized with a solution of 35 grms. sodium nitrite in 50 cc. of water. The mixture is then warmed very slowly up to 55° C. and is kept at that temperature until the diazo reaction has disappeared. The solvent is then distilled off under reduced pressure. The residue is dissolved in water and the arseno compound precipitated from the solution by the action upon this solution of sodium hydrosulphite. The precipitate is aspirated, washed, and dissolved with hydrogen peroxide. The solution is then neutralized with sodium bicarbonate filtered and considerably concentrated by evaporation in vacuo. Subsequently the crude arsonic acid is precipitated with concentrated hydrochloric acid and purified by redissolving it in the presence of sodium bicarbonate. The pure alpha-hydroxy-beta-pyridine arsonic acid is obtained in snowy white small crystals.

*Example 2.*—69 grms. of para-nitroaniline are added to 700 grms, of glacial acetic acid. 180 grms. $AsCl_3$ and 5 grms. CuCl are also added. The diazotizing is executed in the ordinary way by adding a solution of 35 grms. sodium nitrite in 50 cc. of water. The mixture is then allowed to stand until the diazo reaction has disappeared. The solvent is distilled off in vacuo and the residue treated with water in the way described above. From the crude product the pure para-nitro-phenyl arsonic acid is obtained by redissolving it by means of sodium bicarbonate as white powdery scales.

*Example 3.*—67,5 grms. of para-aminoacetophenone are dissolved in about 700 cc. of methanol. 137 grms. of $AsCl_3$, 2 grms. of CuCl and 52 grms. of concentrated sulphuric acid are added. The mixture is diazotized with a solution of 35 grms. NaNO₂ in 50 cc. of water. The mixture is allowed to stand until the diazo reaction has disappeared. The methyl alcohol is distilled off and the residue treated in the manner described in Example 1. In this way pure acetophenone-para-arsonic acid is obtained.

What I claim is:

1. A process for arsenating organic compounds which consists in reacting diazo compounds with halogen compounds of arsenic and decomposing the product resulting from the reaction.

2. A process for arsenating organic compounds which consists in reacting diazo compounds with arsenious trichloride and decomposing the product thus obtained.

3. A process for arsenating organic compounds which consists in reacting diazo compounds with halogen compounds of arsenic in the presence of as little water as possible and decomposing the product resulting from the reaction.

4. A process for arsenating organic compounds which consists in reacting diazo compounds with halogen compound of arsenic and decomposing the resulting product by treatment with water.

5. Process for arsenating organic compounds which consists in diazotizing organic amino compounds in the presence of as little water as possible, reacting the diazo compounds thus obtained with halogen compounds of arsenic and decomposing the double compound obtained.

6. Process for arsenating organic compounds which consists in diazotizing organic amino compounds in the presence of as little water as possible, reacting the diazo compounds with arsenious trichloride and decomposing the product thus obtained.

7. Process for arsenating organic compounds which consists in diazotizing organic amino compounds in the presence of catalysts causing the diazo compounds thus obtained to react with halogenides of arsenic and decomposing the products thus obtained.

8. Process for arsenating organic compounds which consists in diazotizing organic amino compounds in the presence of copper compounds causing the diazo compounds thus obtained to react with halogenides of arsenic and decomposing the product thus obtained.

9. Process for arsenating organic compounds which consists in diazotizing organic amino compounds, reacting the diazo compounds thus obtained with halogen compounds of arsenic and decomposing the resulting product by treatment with water.

10. Process for arsenating organic compounds which consists in diazotizing organic amino compounds in the presence of halogen compounds of arsenic using as little water as possible and decomposing the double compound thus obtained.

11. Process for arsenating organic compounds which consists in diazotizing organic amino compounds in the presence of arsenious trichloride using as little water as possible and decomposing the double compound thus obtained.

12. Process for arsenating organic compound which consists in diazotizing organic amino compounds in the presence of halogen compounds of arsenic using as little water as possible and decomposing the double compound thus obtained by treatment with water.

13. Process for arsenating organic compounds which consists in diazotizing organic amino compounds in the presence of halogen compounds of arsenic in presence of catalysts using as little water as possible and decomposing the double compound thus obtained.

14. Process for arsenating organic compounds which consists in diazotizing organic amino compounds in the presence of arsenious trichloride in presence of catalysts using as little water as possible and decomposing the double compound thus obtained.

15. Process for arsenating organic compounds which consists in diazotizing organic amino compounds in the presence of halogen compounds of arsenic in presence of catalysts using as little water as possible and decomposing the double compound thus obtained by treatment with water.

Signed at Frankfurt a/M, Germany, this 23rd day of October, A. D. 1926.

EMIL SCHELLER.